United States Patent [19]

Damman et al.

[11] Patent Number: 5,151,064
[45] Date of Patent: Sep. 29, 1992

[54] GRAIN TANK FOR A HARVESTER THRESHER

[75] Inventors: Martin Damman; Gerhard Theissing, both of Harsewinkel, Fed. Rep. of Germany

[73] Assignee: Class OHG, Harsewinkel, Fed. Rep. of Germany

[21] Appl. No.: 697,890

[22] Filed: May 9, 1991

[30] Foreign Application Priority Data

May 21, 1990 [DE] Fed. Rep. of Germany ....... 4016319

[51] Int. Cl.$^5$ ............................................. A01F 12/60
[52] U.S. Cl. ........................................ 460/23; 460/119
[58] Field of Search ...................... 460/23, 119, 8, 150

[56] References Cited

U.S. PATENT DOCUMENTS

| | | | |
|---|---|---|---|
| 3,631,862 | 1/1972 | Rowland-Hill | 460/109 |
| 3,670,739 | 6/1972 | Rowland-Hill | 460/66 |
| 3,771,531 | 11/1973 | Scribner | 460/23 |
| 4,100,720 | 7/1978 | Carnewal et al. | 460/119 X |

Primary Examiner—Terry Lee Melius
Attorney, Agent, or Firm—Michael J. Striker

[57] ABSTRACT

A grain tank for a harvester thresher has a plurality of walls including side walls and end walls which together form an upper filling opening, a cover articulately connected with each of the side walls and adapted to close the filling opening, vertically displaceable plates connected with the end walls and associates with the covers so that the covers in an upwardly folded condition together with the upwardly placed plates form a box-shaped structure to increase a volume of the grain tank, straight guides mounted on an inner side of the end walls, a power element operatively connected with the plates, so that the plates are upwardly and downwardly displaceable in the straight guides by the power element and the covers which are articulately connected with the side walls are turned by the plates.

12 Claims, 4 Drawing Sheets

GRAIN TANK FOR A HARVESTER THRESHER

BACKGROUND OF THE INVENTION

The present invention relates to a grain tank for a harvester thresher.

More particularly, it relates to such a grain tank which has side walls and end walls with an upper filling opening which is closeable at least partially by covers that are articulately connected with the side walls. The covers are associated with vertically displaceable plates connected with the end walls, and the covers in the upwardly folded position form together with the upwardly placed plates a box-shaped structure which increases the volume of the grain tank.

Grain tanks of the above mentioned general type are known in the art. One of such grain tanks is disclosed for example in the German Gebrauchsmuster 1,966,426. In the grain tanks formed as described hereinabove it is always extremely problematic to arrange the additional walls since this must be done manually by an operator, who for this purpose must climb on the harvester thresher. It is believed to be clear that this is inconvenient, complicated and time-consuming.

SUMMARY OF THE INVENTION

Accordingly, it is an object of the present invention to provide a grain tank for a harvester thresher, which avoids the disadvantages of the prior art.

More particularly, it is an object of the present invention to provide a grain tank for a harvester thresher of the above mentioned type which can be expanded in its volume without climbing on the harvester thresher and interfering with it.

In keeping with these objects and with others which will become apparent hereinafter, one feature of the present invention resides, briefly stated, in a grain tank in which straight guides are arranged on the inner side of the end walls of the grain tank, and the plates are moved in the straight guides by a power means upwardly and downwardly, and the covers connected with the side walls are turned by the plates.

When the grain tank is designed in accordance with the present invention, it avoids the disadvantages of the prior art and achieves the above specified objects.

In accordance with another feature of the present invention, the plates are connected with the covers articulately by levers.

The power means can be formed as a cylinder-piston unit. In accordance with another embodiment, the power means can be connected with the plates through cable elements.

In particular, the ends of four cables can be connected with the piston rod of the cylinder-piston unit and engage the plates in pairs. The above mentioned cable elements of the power means can be guided over deviating rollers.

The cable elements can be connected by their ends with shackles which in turn are connected with the plates. The shackles are arranged underneath the neighboring deviating rollers.

The power means can be accommodated in a shaft which is formed by the end wall of the grain tank and a plate.

The shaft can also be limited peripherally by a profile which connects the straight guide for the plate with the end wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing a section taken along the line V—V in FIG. 3.

DESCRIPTION OF A PREFERRED EMBODIMENT

Figure 1:
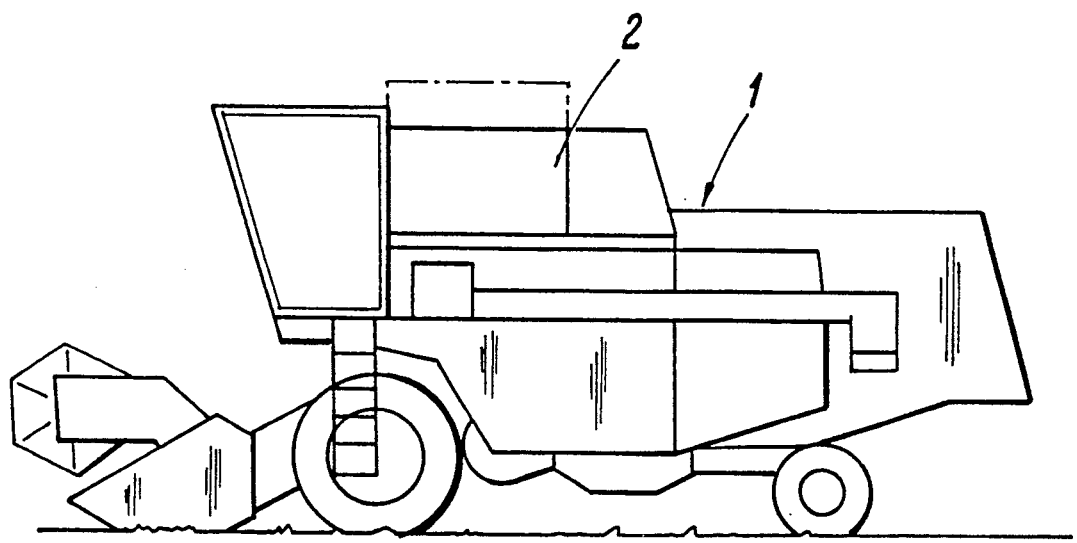
FIG. 1 is a side view of a self-propelling harvester thresher with a grain tank.

A self-propelling harvester thresher is identified as a whole with reference numeral 1. It has a grain tank 2 with a filling opening 3.

The grain tank 2 has side walls 4 and two-part covers 7 and 8. The covers 7 and 8 are connected with the side walls 4 of the grain tank by hinges 5 and 6. The covers 7 and 8 close the upper filling opening 3 in their unfolded condition, as shown at the left side of FIG. 3. In many cases the cover halves which face one another are connected with the side walls in the folded condition. As can be seen particularly from FIG. 3, the outer halves of the covers 7 and 8 are pivotally connected with plates 11 and 12 by levers 9 and 10.

Figure 4:
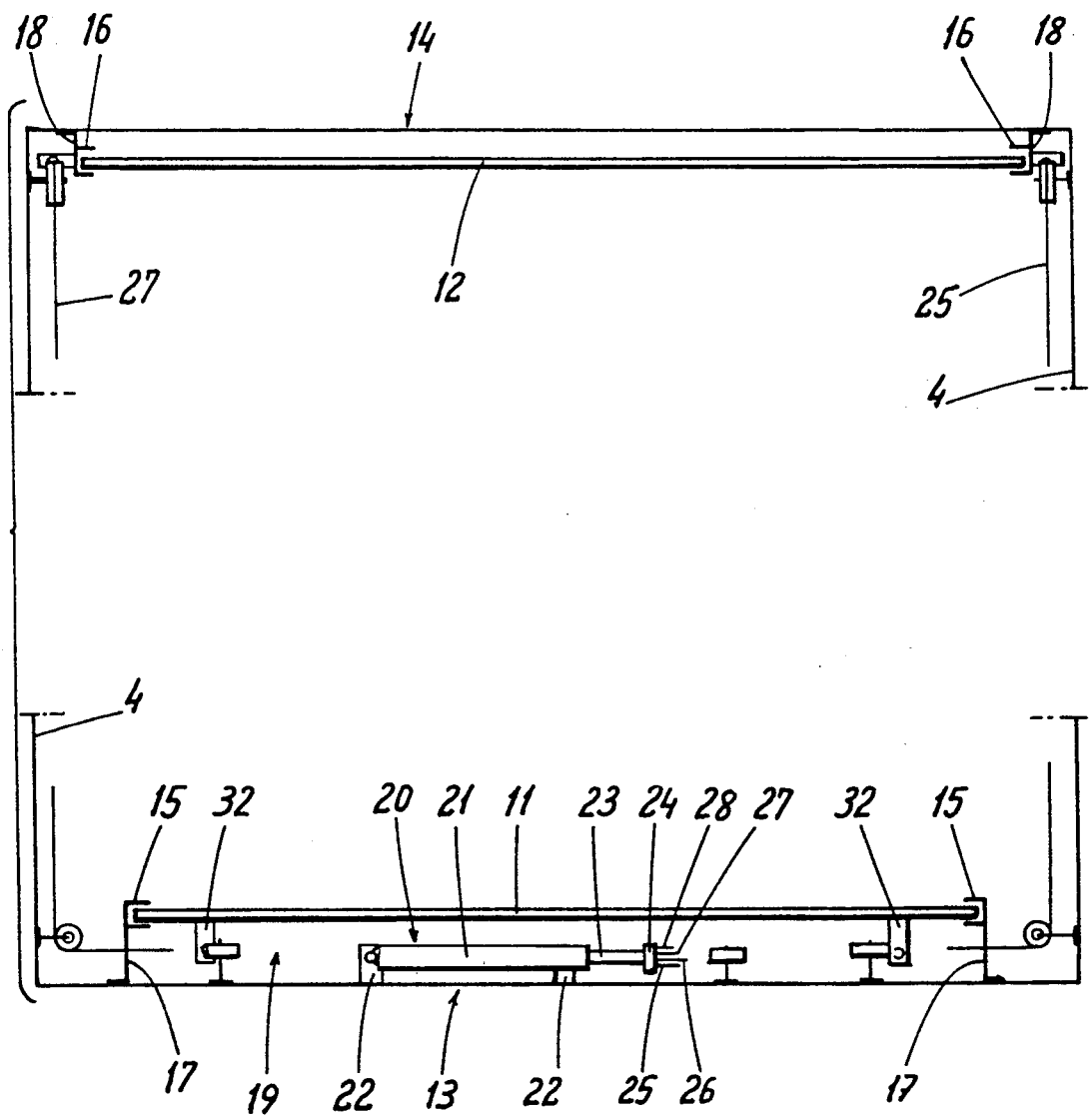
FIG. 4 is a plan view of the grain tank in a section, with displacing and deviating elements.

The plates 11 and 12 are arranged in the region of end walls 13 and 14 of the grain tank 2. They are held in straight guides which are formed as U-rails 15 and 16, so that they can move up and down. The U-rails 15 and 16 are fixedly connected with the end walls 13 and 14 through angle iron profiles 17 and 18. As can be seen from FIG. 4, the distance of the plate 11 from the front end wall 13 is greater than the distance of the plate 12 from the rear end wall 14. This greater distance is required to arrange a power element for the upwardly and downwardly moving plates 11 and 12 in a shaft 19 which is formed by the end wall 13, the plate 11 and the angle profile 17.

The power element in the shown embodiment is formed as a hydraulic cylinder-piston unit 20. The cylinder-piston unit 20 has a cylinder 21 which is connected with the front end wall 13 through a holder 22. The piston rod 23 of the cylinder-piston rod 20 has a head piece 24 which is connected with one side of four cables 25 -28. The cables 26 and 29 are guided over deviating rollers 29 and 30 and engage shackles 32 which are welded of the lower region of the plate 11. The above mentioned deviating rollers are connected with the front end wall 13 of the grain tank 2 in a freely-rotatable manner. The other cables 25 and 27 are guided over further deviating rollers 33, 34, and 35 to shackles 36 and then connected with them. The shackles 36 are fixedly welded with the lower region of the rear plate 12.

Figure 2:
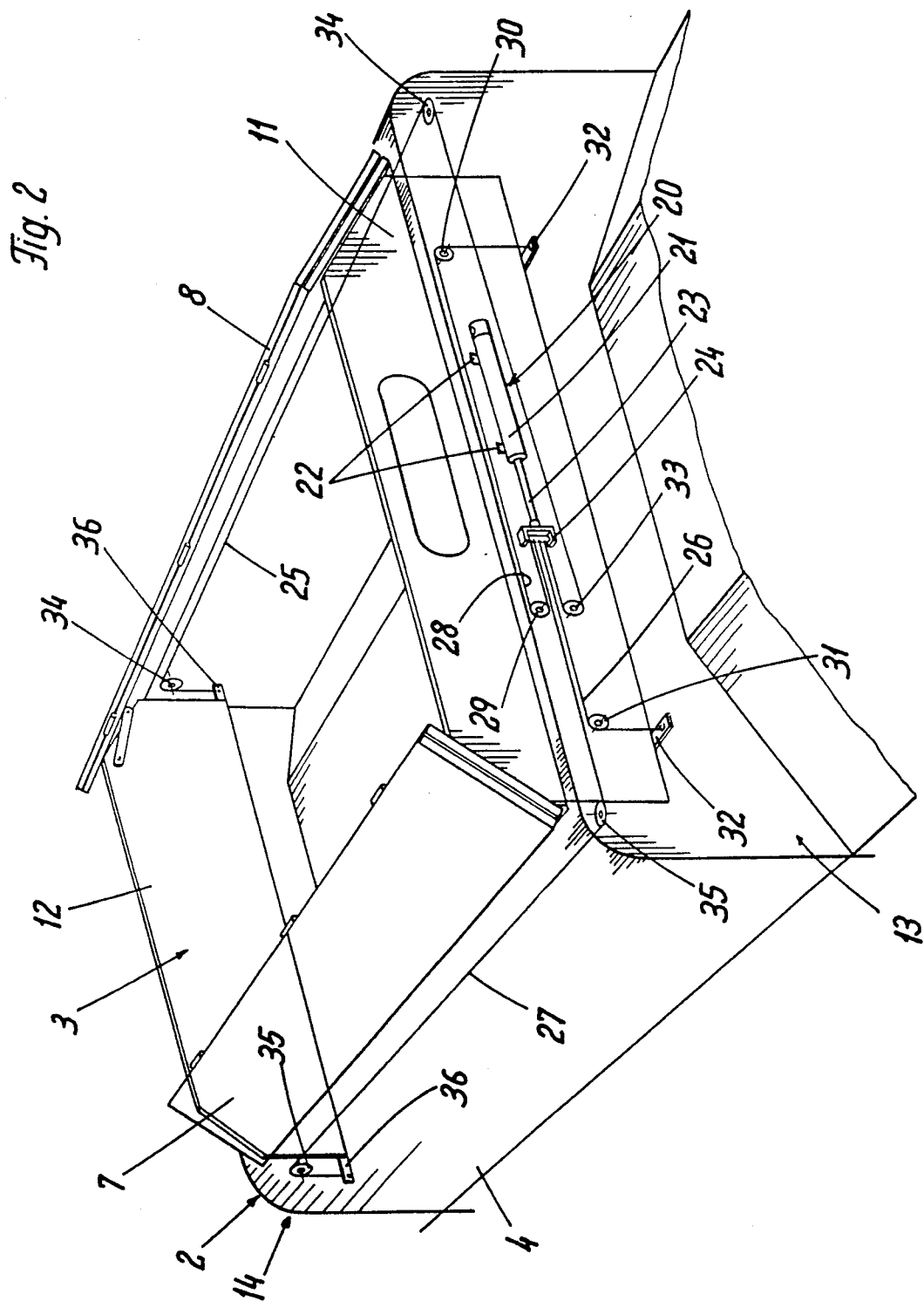
FIG. 2 is a perspective view of the grain tank of FIG. 1 in accordance with the present invention.
Figure 3:
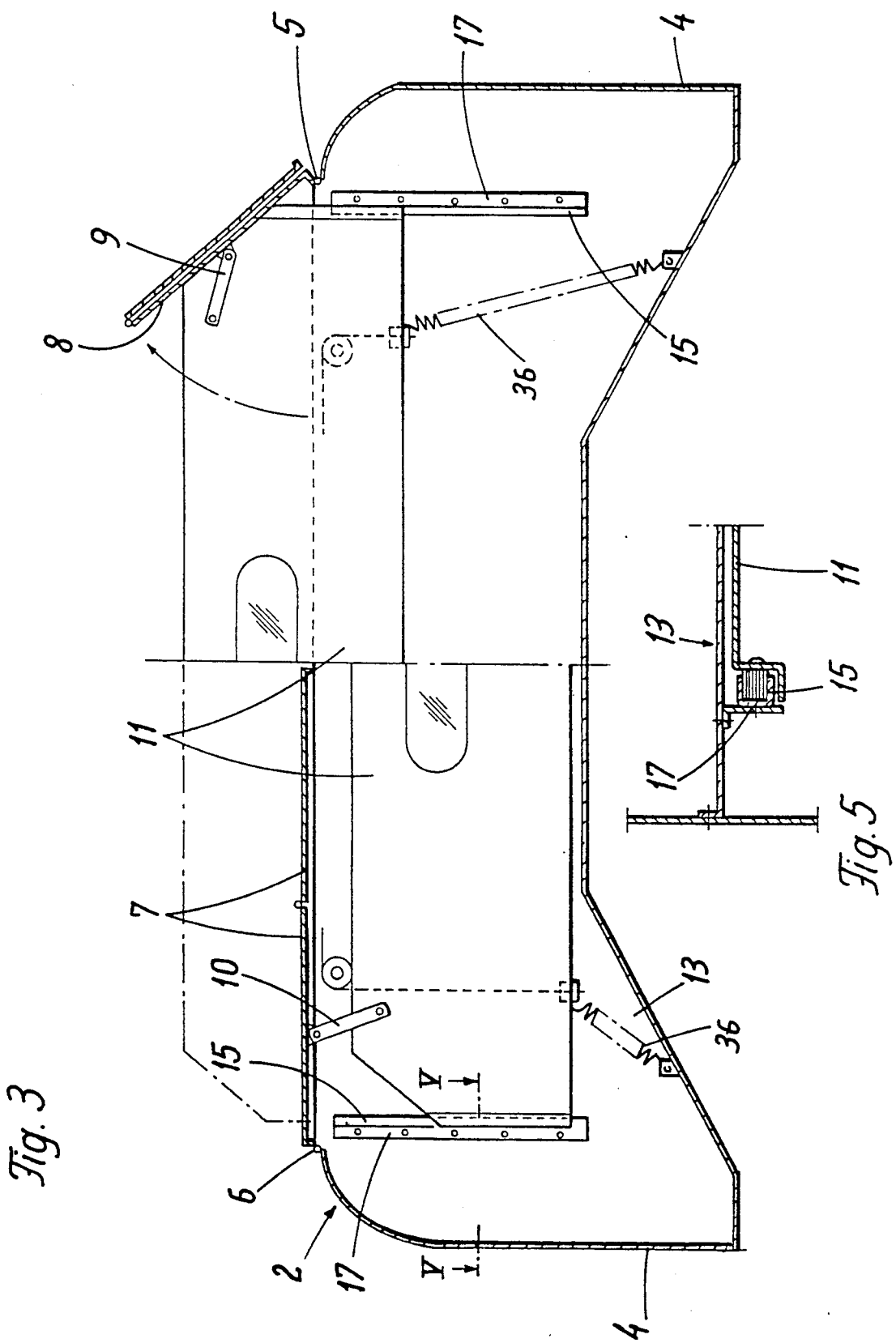
FIG. 3 is a view showing a section of the inventive grain tank drawn along the line III—III in FIG. 2.

As shown in FIG. 2 and in the right half of FIG. 3, the covers 7 and 8 rest in their folded position on the roof-shaped inclined edges of the upwardly extending plates 11 and 12, so that a peripherally closed box structure is obtained. Due to this structure the volume of the grain tank 2 is significantly increased. For forming such a box-shaped structure, it is necessary to activate the cylinder-piston unit 20 or in other words to move in this piston rod 23. With this movement the plates 11, 12 shown in the left half of FIG. 3 in their lowered position are pulled upwardly by the cables against the force of pulling springs 36. The pulling springs 36 are suspended with their ends on the tank bottom and the plates 11 and 12. Simultaneously with the above mentioned movement the covers 7 and 8 are placed on through the levers 9 and 10 and reach the position shown in FIG. 2. For further turning-in of the covers 7 and 8, it is however required to move in the piston rod 23 of the cylinder-piston unit 22. Then the covers 7 and 8 are folded inwardly under the action of their own weight. Simultaneously the plates 11 and 12 slide downwardly in their guides 15 and 16 with the support from the pulling springs 36.

It will be understood that each of the elements described above, or two or more together, may also find a useful application in other types of constructions differing from the types described above.

While the invention has been illustrated and described as embodied in a grain tank of a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A grain tank for a harvester thresher, comprising a plurality of walls including side walls and end walls which together form an upper filling opening; a cover articulately connected with each of said side walls and adapted to close said filling opening; vertically displaceable plates connected with said end walls and associated with said covers so that said covers in an upwardly folded condition together with said upwardly placed plates form a box-shaped structure to increase a volume of the grain tank; straight guides mounted on an inner side of said end walls; power means operatively connected with said plates, so that said plates are upwardly and downwardly displaceable in said straight guides by said power means and said covers which are articulately connected with said side walls are turned by said plates.

2. A grain tank as defined in claim 1; and further comprising means for articulately connecting said plates with said covers.

3. A grain tank as defined in claim 2, wherein said articulately connecting means include levers which connect said plates with said covers.

4. A grain tank as defined in claim 1, wherein said power means includes a cylinder-piston unit.

5. A grain tank as defined in claim 1; and further comprising means for connecting said power means with said plates.

6. A grain tank as defined in claim 5, wherein said connecting means include cable elements.

7. A grain tank as defined in claim 4, wherein said cylinder-piston unit has a piston rod; and further comprising four cables which connect said power means with said plates, said four cables having ends which are connected with said piston rod and engage with said plates in pairs.

8. A grain tank as defined in claim 7; and further comprising deviating rollers arranged so that said cable elements are guided over said deviating rollers.

9. A grain tank as defined in claim 8; and further comprising shackles which are connected with said plates and located underneath said deviating rollers, said cable elements having ends which are connected with said shackles.

10. A grain tank as defined in claim 1, wherein one of said end walls and one of said plates form therebetween a hollow shaft, said power means being supported in said shaft.

11. A grain tank as defined in claim 10; and further comprising profiles each connecting each of said straight guides with each of said end walls.

12. A grain tank as defined in claim 11, wherein said profiles which connect said straight guides with said end walls limit said shaft peripherally, in addition to said plates and said end walls.

* * * * *